No. 629,386. Patented July 25, 1899.
J. McCULLOCH.
STEAM ACTUATED VALVE FOR PUMPS.
(Application filed July 25, 1898.)
(No Model.) 8 Sheets—Sheet 1.

Witnesses
Inventor
James McCulloch
By James L. Norris
Atty

No. 629,386. Patented July 25, 1899.
J. McCULLOCH.
STEAM ACTUATED VALVE FOR PUMPS.
(Application filed July 25, 1898.)

(No Model.) 8 Sheets—Sheet 3.

No. 629,386. Patented July 25, 1899.
J. McCULLOCH.
STEAM ACTUATED VALVE FOR PUMPS.
(Application filed July 25, 1898.)
(No Model.) 8 Sheets—Sheet 5.

Witnesses
Inventor
James McCulloch
By James L. Norris
Atty

No. 629,386. Patented July 25, 1899.
J. McCULLOCH.
STEAM ACTUATED VALVE FOR PUMPS.
(Application filed July 25, 1898.)

(No Model.) 8 Sheets—Sheet 6.

Witnesses
Inventor
James McCulloch
By James L. Norris

No. 629,386. J. McCULLOCH. Patented July 25, 1899.
STEAM ACTUATED VALVE FOR PUMPS.
(Application filed July 25, 1898.)

(No Model.) 8 Sheets—Sheet 7.

No. 629,386. Patented July 25, 1899.
J. McCULLOCH.
STEAM ACTUATED VALVE FOR PUMPS.
(Application filed July 25, 1898.)

(No Model.) 8 Sheets—Sheet 8.

Witnesses Inventor
James McCulloch
By James L. Norris

THE NORRIS PETERS CO., PHOTO-LITHO., WASHINGTON, D. C.

UNITED STATES PATENT OFFICE.

JAMES McCULLOCH, OF PORTREATH, ENGLAND.

STEAM-ACTUATED VALVE FOR PUMPS.

SPECIFICATION forming part of Letters Patent No. 629,386, dated July 25, 1899.

Application filed July 25, 1898. Serial No. 686,859. (No model.)

*To all whom it may concern:*

Be it known that I, JAMES McCULLOCH, engineer, a subject of the Queen of Great Britain, residing at Portreath, in the county of Cornwall, England, have invented certain new and useful Improvements in Steam-Actuated Valves for Pumps, of which the following is a specification.

This invention relates to pumps adapted to be worked by steam or other fluid, and is designed to simplify and cheapen the construction of the same; and, furthermore, to produce a pump which shall have greater capacity relatively to its size than steam-pumps as usually constructed.

An important feature of the said invention consists in the employment of a single automatic distributing-valve which is so arranged as to be cushioned at each end of the stroke. A further important feature of the invention consists in utilizing the middle or intermediate portion of the steam-piston, as hereinafter described, for the purpose of controlling the exhaust of the fluid used to operate the valve.

In the accompanying drawings.

Referring more particularly to the construction of pump shown in Figs. 1 to 5, $a$ is the pump-cylinder, and $b$ is the working or steam cylinder, which is arranged parallel with and beneath the pump-cylinder. $a'$ and $b'$ are the pistons of the said cylinders. $c$ is the distributing-valve, which is of the piston type, and is arranged by the side of the steam-cylinder and parallel therewith.

The steam-piston $b'$ is of considerable length, and has in it two annular recesses or ports $b^2$, which are arranged on each side of its middle portion $b^3$. In other words, the piston consists of three disks or junks $b^3$, $b^4$, and $b^5$, one at each end and one in the middle thereof, all of which are integrally connected together by contracted portions or necks of small diameter, the spaces around these necks forming the annular ports $b^2$, before referred to.

Between the valve $c$ and the piston $b'$ the casing is provided with three main ports or passages $d\,d'\,d^2$ analogous to those of an ordinary steam-engine. The intermediate port $d'$, which leads to the exhaust-pipe $d^3$, is provided with an opening $d^4$, leading into the steam-cylinder at the middle thereof. To prevent the live steam or working fluid, however, from escaping by this intermediate port, the piston is made of such a length relatively to the stroke that it never opens the said port to either end of the cylinder. One or other of the annular intermediate ports $b^2$ of the piston, however, is constantly in communication with the said port to allow the exhaust working fluid of the valve to escape in the manner hereinafter described.

The distributing-valve $c$ has at each end thereof a space $c^x$, into which motive fluid is admitted for reversing the valve. This valve is of the piston type and has hollow ends $c'$ and has also an intermediate port $c^2$ for putting the ends of the cylinder to exhaust alternately in the ordinary manner. The live-steam ports are arranged one on either side of this exhaust-port, as shown at $c^3$, while in the opposite side of the valve to the said exhaust-port is a passage or slot $c^4$, in which fits a pin $c^5$ to keep the valve from turning in its seat.

In addition to the main passages already referred to there are four small subsidiary passages $e\,e'\,f\,f'$, arranged in pairs in the valve-casing. The passages $e\,e'$ of one pair serve to convey steam from the cylinder to operate the valve. They are so arranged that they cross one another—that is to say, the passage $e$, which opens toward the right-hand end of the cylinder, opens into the left-hand end of the valve-chamber, and vice versa with the passage $e'$. These passages $e$ $e'$ are arranged so that one or other of them is uncovered by the piston and opened to the steam-space of the cylinder as the piston reaches the ends of its stroke, while at the same time the remaining passage is opened to exhaust by the middle portion $b^3$ of the piston. Consequently a portion of the steam in the cylinder rushes up one of these passages and reverses the valve, while the steam that has just acted on the valve escapes through the other passage which has just been opened to exhaust. The passages $f$ $f'$ of the other pair extend directly between the ends of the valve-chamber and serve as cushioning-passages to cushion the valve in its to-and-fro movements. The ends of these passages are not on a level with each other, but those of the passage $f$ lie somewhat to the left of those of the other. By means of these passages a portion of the steam which is reversing the valve can escape to the opposite end of the valve-casing very soon after the valve has commenced to travel, thus effectually cushioning the valve. In addition to this, the valve-casing may be provided at each end with a suitable stop or buffer—such, for instance, as a metal disk or ring $g$, having an india-rubber ring $g'$ behind it to give it elasticity. The piston-rods of the pump and the steam-cylinders are in this case connected together by a cross-head $h$, working on suitable guides $h'$, which carry the elastic buffers or stops $h^2$ to arrest the movement without shock in starting the pump or in case the water or other fluid supply should suddenly fail. The inlet-valves $i$ and outlet-valves $i'$ of the pump-chamber are in this construction arranged symmetrically on the upper part of the casing, one pair near each end of the pump.

The pistons and the valve are all contained in a single casing, in which are formed the necessary passages or ports hereinafter described and in the upper parts of which are the inlet-valves $i$ and outlet-valves $i'$ from the pump. They consist of lift-valves having openings $i^2$ formed in them, so that the water or other liquid (when the valves lift) can flow through them as well as around their peripheries, thereby causing the valves to have an ample area of opening with a small amount of lift and reducing the hammering and slip well known in water-valves. $i^3$ are the valve-seats, which have cross pieces or bars $i^4$ serving to cover the openings $i^2$ when the valves are closed. The said valves have each a guide arranged at the top thereof, such guides comprising a vertical pin $i^5$, which projects into a recess $i^6$ in the valve-cover, thereby allowing the valve-seat to have a greater effective area than if the guide were arranged at the bottom of the valve or were passed through the valve and seat.

Figure 1:
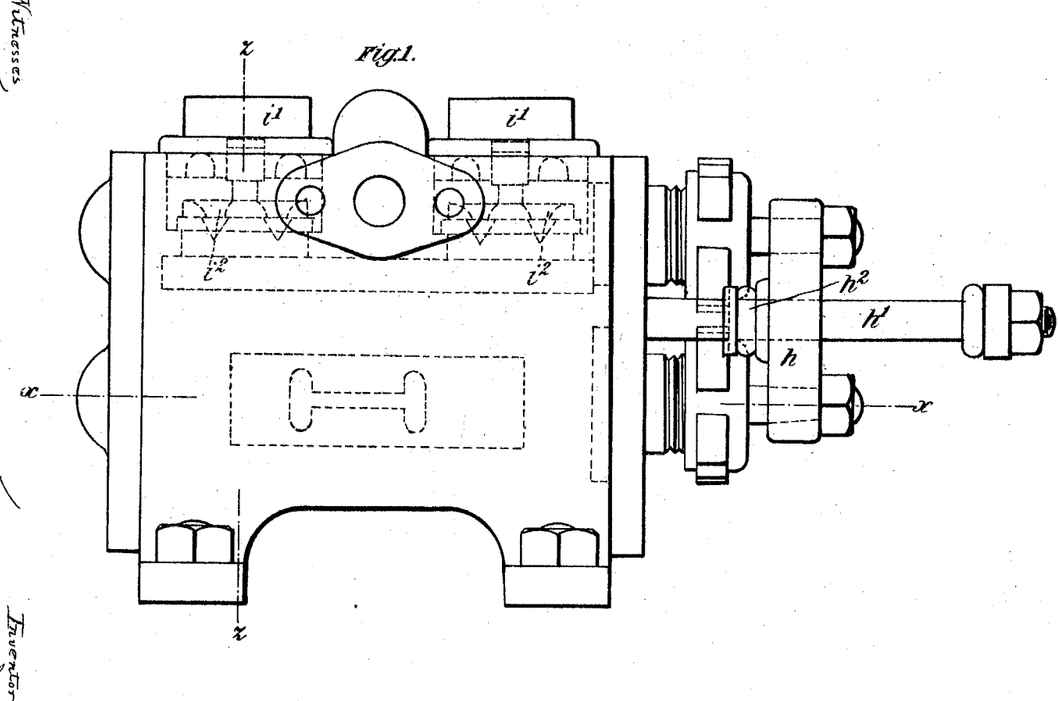
Figure 1 is a side elevation, and Fig. 2 a plan, of one construction of pump according to this invention, wherein the pump-cylinder and the working cylinder are arranged side by side.
Figure 2:
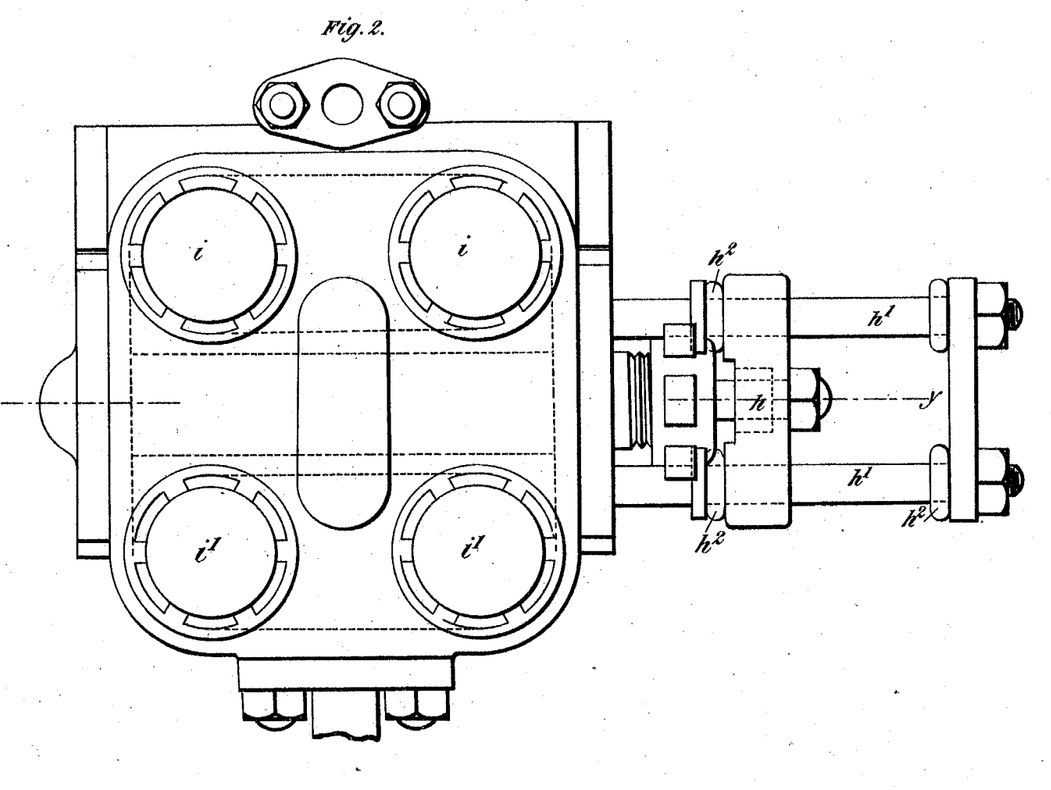
Figure 3:
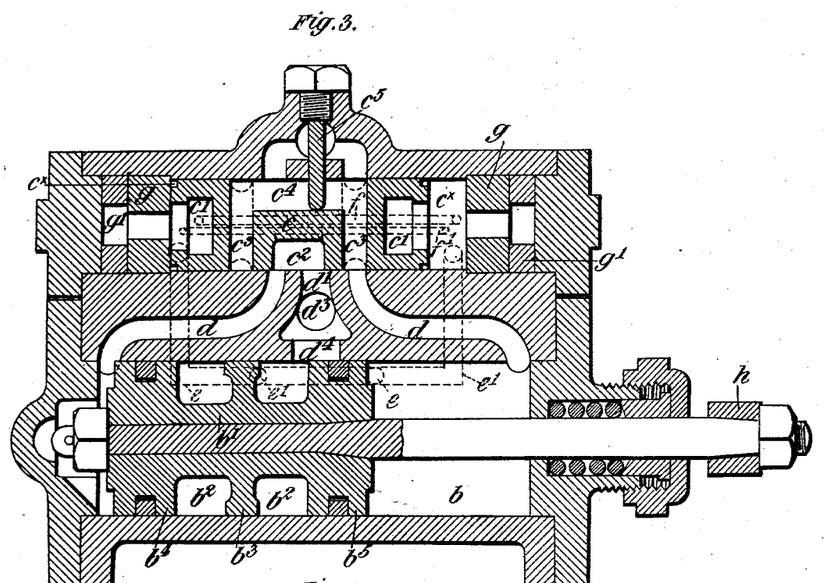
Fig. 3 is a horizontal section on the line $x\,x$, Fig. 1.
Figure 4:
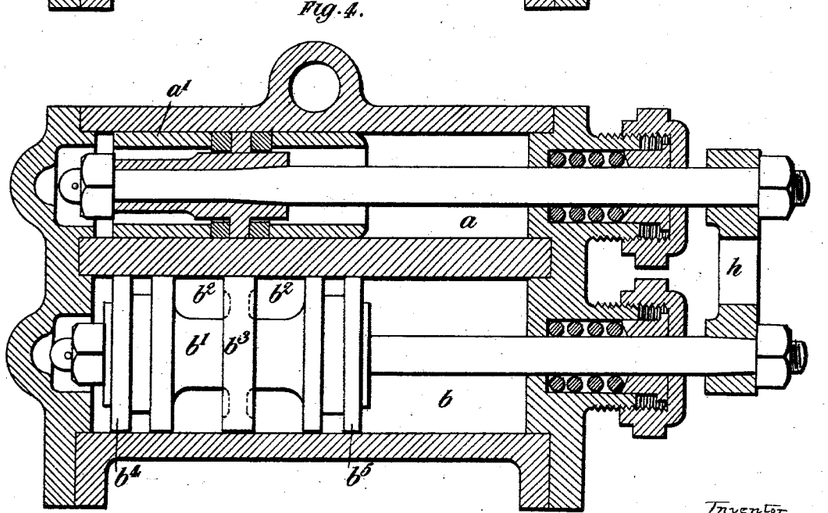
Fig. 4 is a vertical section on the line $y\,y$, Fig. 2.
Figure 5:
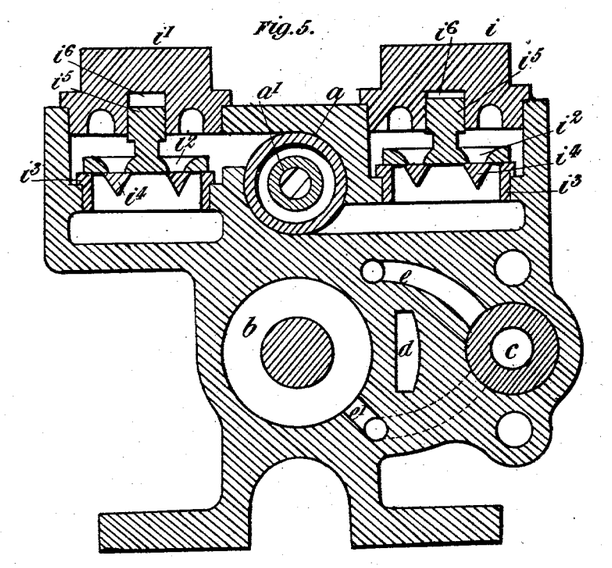
Fig. 5 is a transverse section on the line $z\,z$, Fig. 1.
Figure 6:
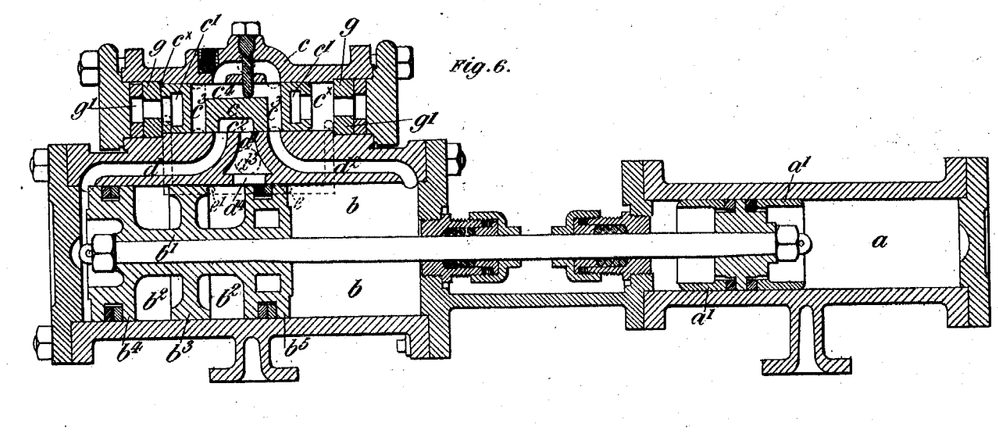
Fig. 6 is a vertical longitudinal section of a modified arrangement in which the pump-cylinder and working cylinder are arranged tandem fashion or in line with one another.

The foregoing construction is more especially intended for a pump where compactness is an object; but obviously it may be modified in a variety of ways, especially in cases where space is not so much a matter of importance. For instance, as shown in Fig. 6, the steam-cylinder and the pump-chamber may be separate castings and be arranged tandem fashion—i. e., in line with one another. In the example shown the working cylinder $b$ and the self-acting valve $c$, controlling the same, are constructed substantially in the same manner as that hereinbefore described.

Figure 7:
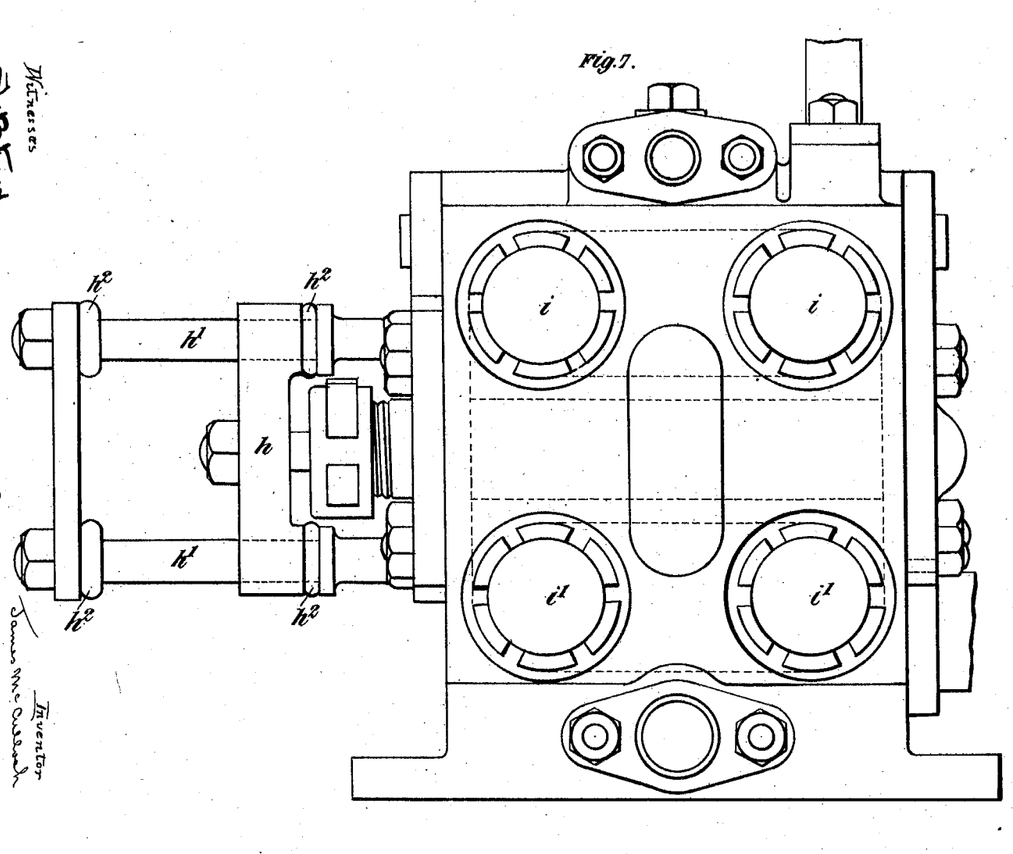
Fig. 7 is a side elevation of an arrangement in which two pump-cylinders are employed, one on each side of the working cylinder.
Figure 8:
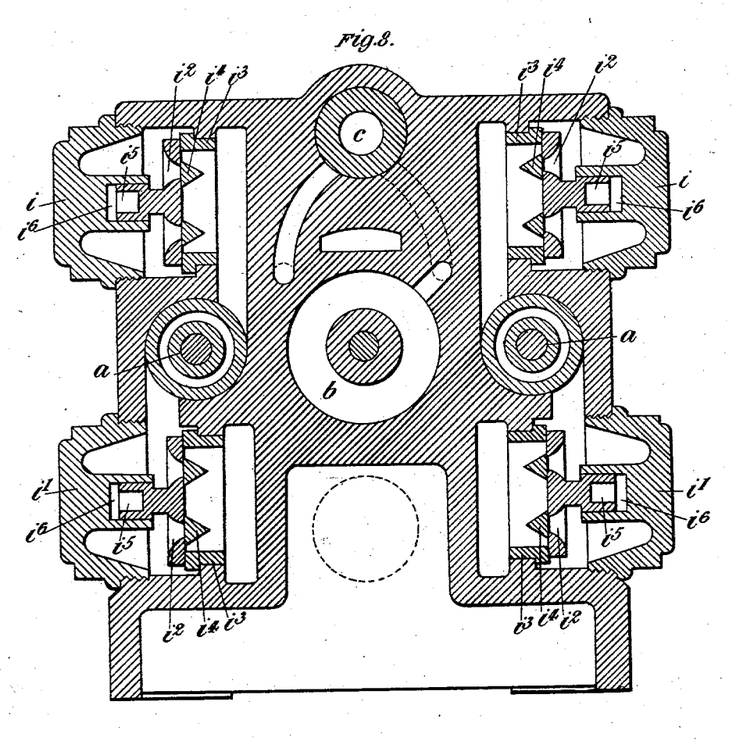
Figs. 8 and 9 are respectively a vertical section and a horizontal section of the said arrangement.
Figure 9:
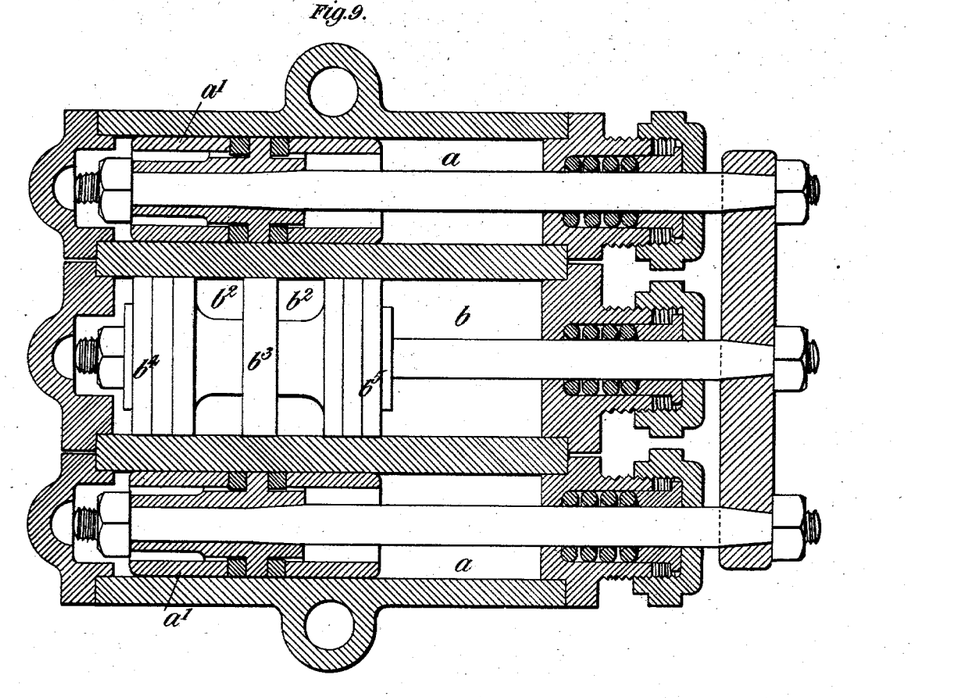

According to the modification shown in Figs. 7 to 9 two pump-chambers $a$ are employed, arranged on opposite sides of the working cylinder $b$ in order to balance the strains. In such a case the inlet and outlet valves $i$ $i'$ of the pump-cylinders are arranged at the sides of the pump instead of on the upper part thereof, as in the first-mentioned arrangement.

Figure 10:
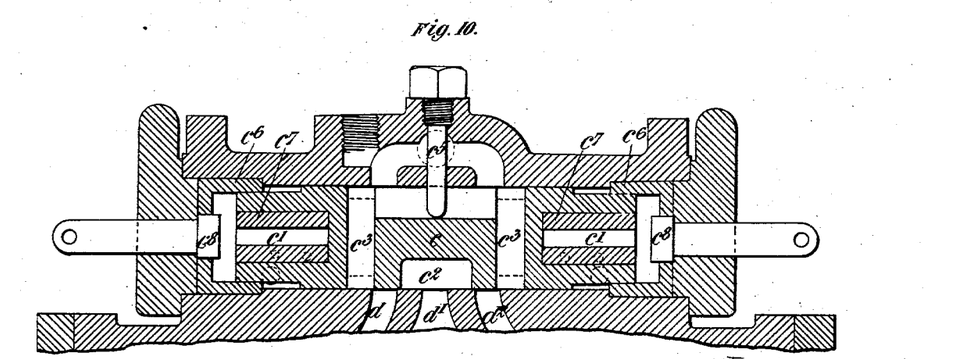
Fig. 10 is a longitudinal section showing to a larger scale a slight modification in the construction of the distributing-valve suitable more especially for pumps of large size.

In some cases, as in pumps of larger size, the end area of the distributing-valve may be greater than it is actually necessary for the steam to act on in order to reverse the valve, and consequently the valve would, if exactly like those in the previous arrangements, be driven to and fro with undue force. To overcome this difficulty, the modified arrangement shown in Fig. 10 may be employed, in which the hollow ends $c'$ of the valve are reduced in area and are adapted to work in bushings $c^6$, formed on the end covers of the valve-chest. The buffers in this case consist of rubber or other elastic thimbles or rings $c^7$, fitted in the hollow ends of the valve. The ends of those rings are adapted to strike against projecting push-pieces $c^8$, which latter extend fluid-tight through the end covers of the valve-chest and can be used for moving the valve by hand when necessary.

I claim—

1. In a pump, the combination with a piston-valve having a space at each end for motive fluid, of a working piston having two annular recesses, or ports on opposite sides of a central disk, or junk, a central exhaust-port having an opening into the working cylinder, and subsidiary steam-passages opening into the cylinder on opposite sides of the central exhaust-passage and crossing each other to the spaces at the ends of the piston-valve, substantially as described.

2. In a pump, the combination with a piston-valve having spaces for motive fluid in its ends, of a working piston having two annular recesses, or ports, on opposite sides of a central disk, or junk, a central exhaust-port having an opening into the working cylinder, subsidiary steam-passages opening into said cylinder on opposite sides of the exhaust-opening and crossing each other to the end spaces of the piston-valve, and cushioning-passages for live steam from one end space to the other, substantially as described.

3. In a pump the combination of a valve, a working cylinder, spaces at the ends of said valve, passages leading from said spaces to said cylinder, means for causing the working piston to control said passages, and cushioning-passages extending directly between the said spaces so as to cushion the valve in the to-and-fro movements.

4. In a pump the combination of a piston-valve, means for operating the same by motive fluid from the cylinder, spaces at the ends of the valve to receive said motive fluid, cushioning-passages extending between said spaces, and buffers for arresting the movements of the valves, substantially as described.

5. In a pump, the combination with a working cylinder and piston of a piston-valve for said cylinder, live-steam passages from said cylinder to end spaces in the valve and cushioning-passages directly connecting said spaces, substantially as described.

6. In a pump, the combination with a working piston and cylinder the latter having a central opening communicating with an exhaust-passage, of steam-passages from the cylinder to end spaces of the piston-valve, and cushioning-passages connecting said spaces, substantially as described.

7. In a pump the combination of a working cylinder, two pump-cylinders parallel therewith and on each side thereof, a cross-head connecting the pistons of said pump and working cylinders, a distributing-valve parallel with said cylinders, and means for controlling the distribution of working fluid from the working cylinder to the ends of said valve so as to reverse the latter substantially as described.

In testimony whereof I have hereunto set my hand, in presence of two subscribing witnesses, this 4th day of July, 1898.

JAMES McCULLOCH.

Witnesses:
F. W. McLELLAN,
WALTER J. SKERTEN.